United States Patent
Hsieh et al.

(10) Patent No.: US 7,859,832 B2
(45) Date of Patent: Dec. 28, 2010

(54) PORTABLE COMPUTER AND FIXING STRUCTURE THEREOF

(75) Inventors: Chih-Ho Hsieh, Taipei (TW); Wen-Chou Liu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 178 days.

(21) Appl. No.: 12/193,756

(22) Filed: Aug. 19, 2008

(65) Prior Publication Data

US 2009/0052130 A1 Feb. 26, 2009

(30) Foreign Application Priority Data

Aug. 24, 2007 (TW) .............................. 96131438 A

(51) Int. Cl.
*H05K 5/00* (2006.01)
*H05K 7/00* (2006.01)
(52) U.S. Cl. ........................... 361/679.33; 361/679.37; 361/679.38
(58) Field of Classification Search ............ 361/679.33, 361/679.37, 679.38
See application file for complete search history.

(56) References Cited

U.S. PATENT DOCUMENTS 6,788,532 B2 * 9/2004 Yang et al. ............. 361/679.33
2007/0268661 A1 * 11/2007 Wobig et al. ................ 361/685

FOREIGN PATENT DOCUMENTS

CN 1734391 2/2006
CN 1854976 11/2006

OTHER PUBLICATIONS

"1st Office Action of China counterpart application", issued on Mar. 30, 2010, p. 1-p. 5.

* cited by examiner

Primary Examiner—Jayprakash N Gandhi
Assistant Examiner—Anthony M Haughton
(74) Attorney, Agent, or Firm—Jianq Chyun IP Office

(57) ABSTRACT

A fixing structure for mounting a data storage device in a computer body is provided. The data storage device has two opposite side surfaces. The fixing structure includes two mounting brackets and at least one pull strap. Each mounting bracket is disposed to a corresponding one of the side surfaces. The data storage device is disposed in the computer body via the mounting brackets. The pull strap is connected to at least one of the mounting brackets. The pull strap is extendable to an outside of the computer body when the data storage device is disposed in the compute body.

16 Claims, 4 Drawing Sheets

PORTABLE COMPUTER AND FIXING STRUCTURE THEREOF

CROSS-REFERENCE TO RELATED APPLICATION

This application claims the priority benefit of Taiwan application serial no. 96131438, filed on Aug. 24, 2007. The entirety of the above-mentioned patent application is hereby incorporated by reference herein and made a part of this specification.

BACKGROUND OF THE INVENTION

1. Field of the Invention

The present invention generally relates to a portable computer, and more particularly, to a portable computer and a data storage module of the portable computer.

2. Description of Related Art

With development in technology, electronic apparatus have become indispensable in people's lives. Humanized electronic apparatus with good function have been continuously introduced with the continuous advancing of electronic technology. As to the development and application of personal computers, desktop personal computers (desktop PCs) were first introduced. However, the desktop PCs are bulky and inconvenient to carry. Accordingly, portable computes, such as notebook PCs, were developed with the technology development.

It should be noted that, during the course of making the portable computer thinner, the available internal space of the portable computer is becoming less and less. As a result, various components in the portable computer are positioned close to one another so that the components cannot be easily replaced. To the user, a data storage device (e.g., a hard disk) may often need to be replaced because of insufficiency of the storage capacity or damage. However, the data storage device in the portable computer currently cannot be easily removed from the body of the portable computer.

SUMMARY OF THE INVENTION

Accordingly, the present invention is directed to a data storage module having a fixing structure so that the data storage module can easily be removed from a computer body.

The present invention is also directed to a portable computer that has a thinner computer body.

The present invention provides a fixing structure for mounting a data storage device in a computer body. The data storage device has two opposite side surfaces. The fixing structure includes two mounting brackets and at least one pull strap. Each mounting bracket is disposed to a corresponding one of the side surfaces. The data storage device is disposed in the computer body via the mounting brackets. The pull strap is connected to at least one of the mounting brackets. The pull strap is extendable to an outside of the computer body when the data storage device is disposed in the compute body.

According to one embodiment of the present invention, the data storage device further includes a top surface and a bottom surface opposite to the top surface. Each of the side surfaces is connected to both the top and bottom surfaces. Each mounting bracket includes a bracket body and at least one clamping portion. The bracket body is connected to a corresponding side surface of the data storage device. The clamping portion is bent from the bracket body in a direction toward the data storage device and contacts the top and bottom surfaces.

According to one embodiment of the present invention, the number of the pull straps is two. Each of the pull straps includes a connecting portion and an operating portion. The connecting portions are connected to corresponding mounting brackets, and the operating portions are extendable to the outside of the computer body.

According to one embodiment of the present invention, the operating portions may lie down on the top surface.

According to one embodiment of the present invention, the operating portions may be interconnected.

According to one embodiment of the present invention, each mounting bracket includes a bracket body and at least one mounting portion. The bracket body is connected to a corresponding one of the side surfaces of the data storage device. The mounting portion is bent from the bracket body in a direction away from the data storage device.

According to one embodiment of the present invention, the fixing structure further includes a plurality of second fasteners each fastening a corresponding one of the mounting portions to the computer body.

According to one embodiment of the present invention, the data storage device is a hard disk or an optical disk drive.

The present invention also provides a portable computer. The portable computer includes a computer body, a data storage device, two mounting brackets, and at least one pull strap. The data storage device is disposed in the computer body and has opposite two side surfaces. Each mounting bracket is disposed to a corresponding one of the side surfaces. The data storage device is disposed in the computer body via the mounting brackets. The pull strap is connected to at least one of the mounting brackets and is extendable to an outside of the computer body when the data storage device is disposed in the compute body.

In order to make the aforementioned and other features and advantages of the present invention more comprehensible, embodiments accompanied with figures are described in detail below.

DESCRIPTION OF THE EMBODIMENTS

Figure 1A:
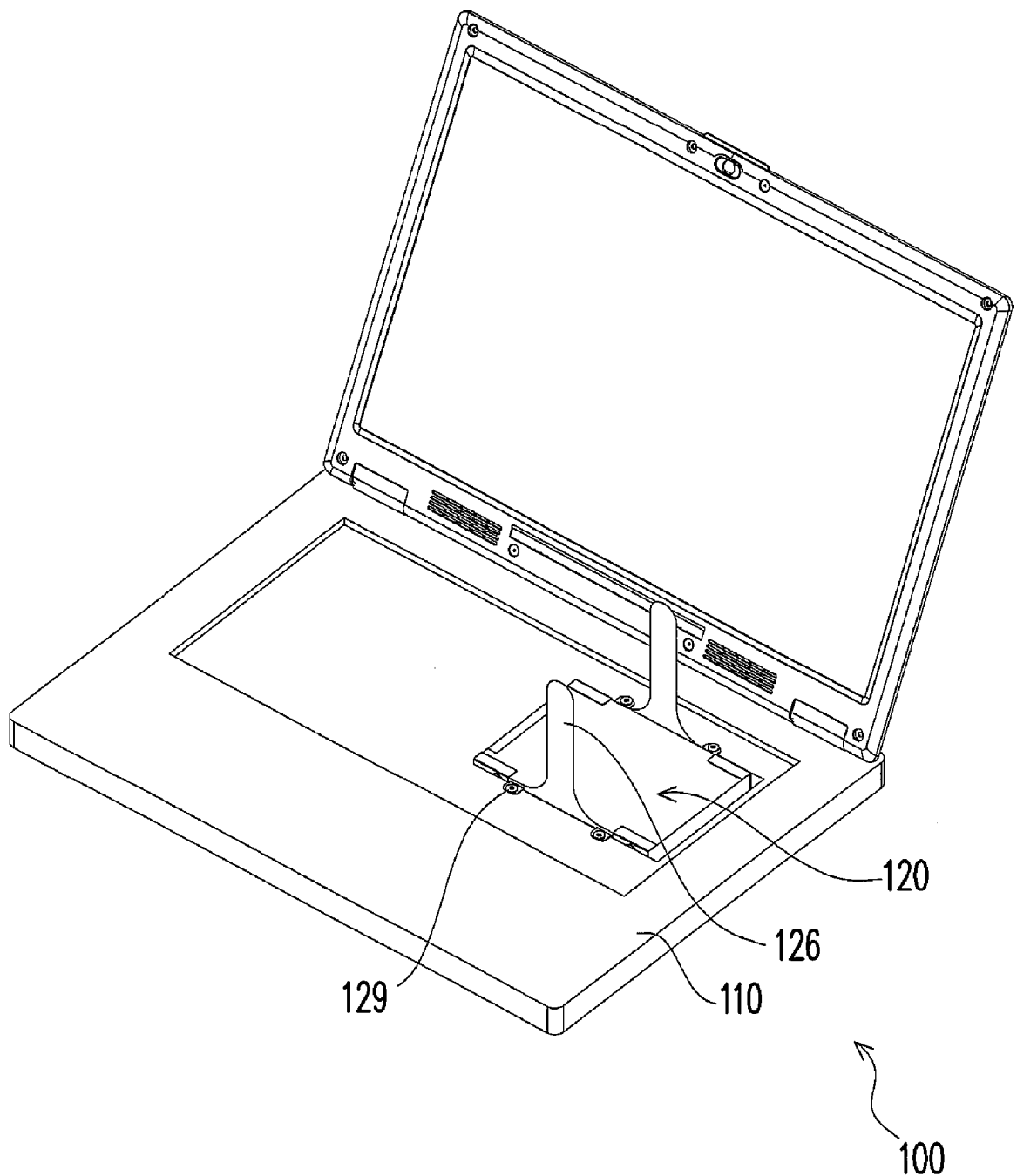
FIG. 1A is a view showing a portable computer according to one embodiment of the present invention, with a portion of a computer body being removed.
Figure 1B:
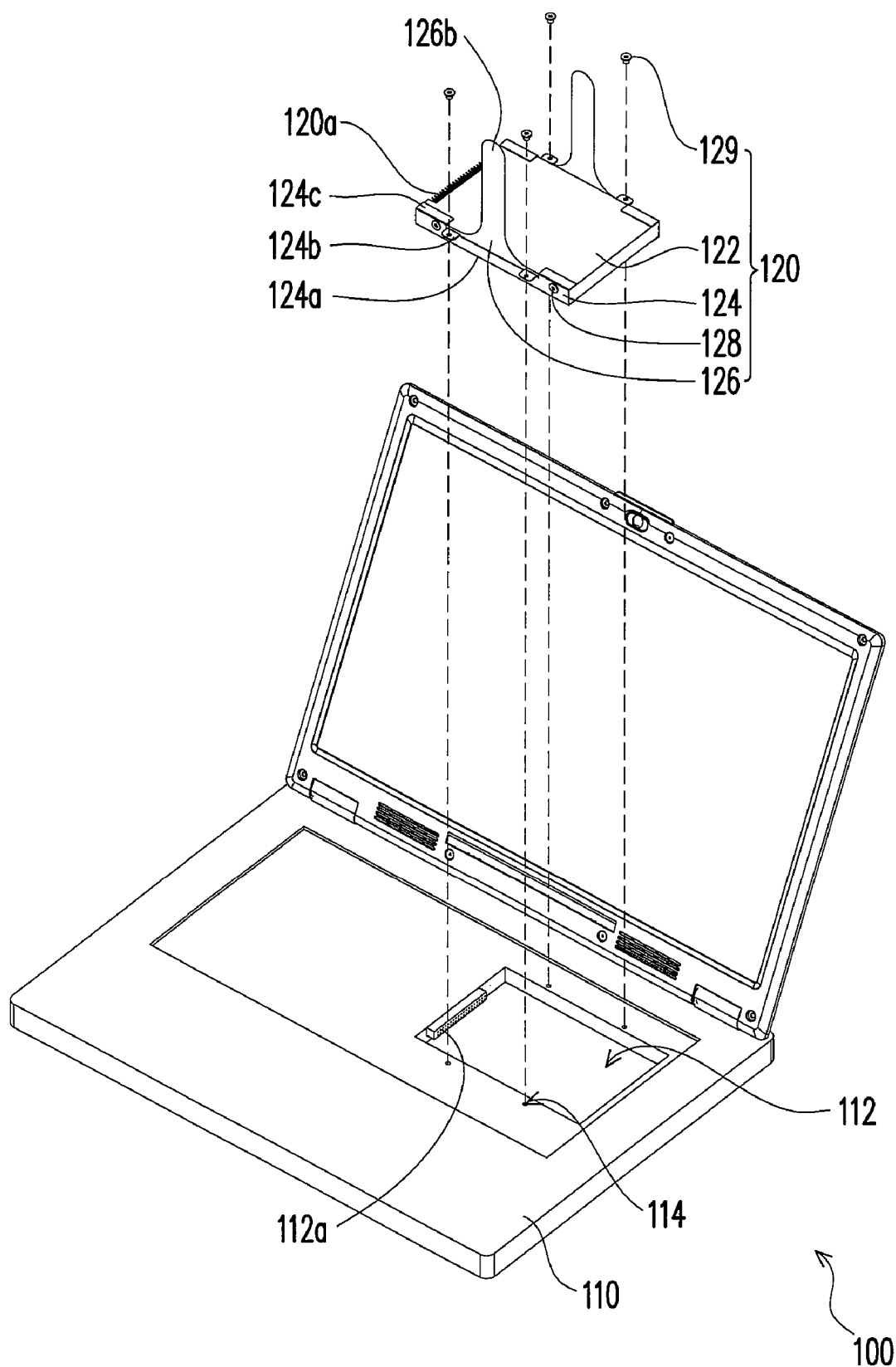
FIG. 1B is a partially exploded view of the portable computer of FIG. 1A.

FIG. 1A is a view showing a portable computer according to one embodiment of the present invention, with a portion of a computer body being removed. FIG. 1B is a partially exploded view of the portable computer of FIG. 1A. Referring to FIGS. 1A and 1B, the portable computer of the present embodiment mainly includes a computer body 110 and a data storage module 120 disposed in the computer body 110.

The computer body 110, for example, has a receiving space 112, and the data storage module 120 is disposed in the receiving space 112. In the present embodiment, the receiving space 112 of the computer body 110 includes an inner wall with, for example, a first connection port 112a formed thereon, and the data storage module 120 includes a second connection port 120a corresponding to the first connection port 112a. When the data storage module 120 is disposed in the receiving space 112, the second connection port 120a of the data storage module 120 can be directly interfaced with the first connection port 112a of the computer body 110, thereby allowing data transmission between the data storage module 120 and the computer body 110. As such, a user can operate the computer body 110 to read data in the data storage module 120 and store data into the data storage module 120.

In other embodiments of the present invention, transmission line or flexible bus (not shown) can be used to interconnect the first connection port 112a and the second connection port 120a for access to the data storage module. The connection between the data storage module 120 and the computer body 110 is described below in more detail.

Figure 2:
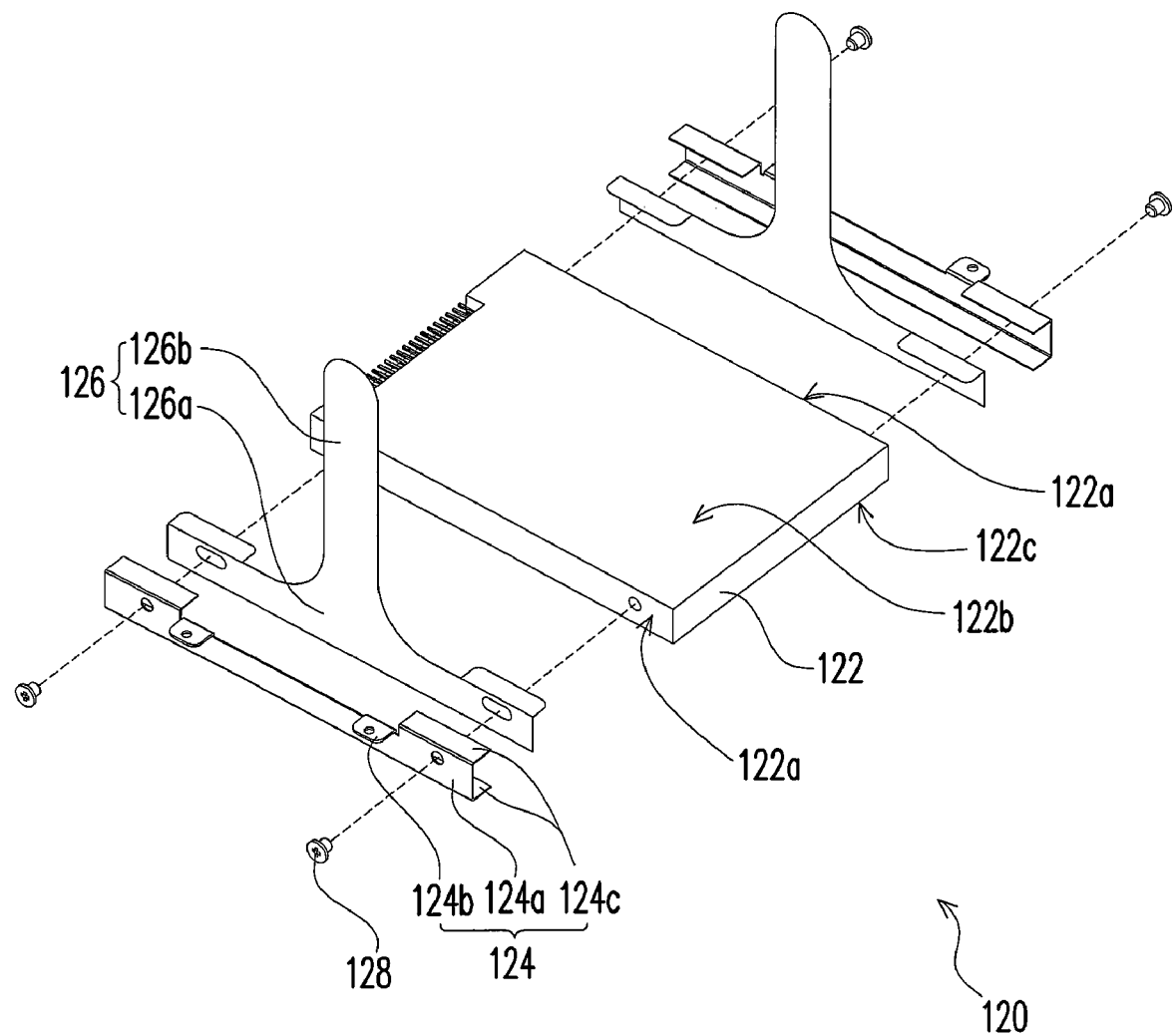
FIG. 2 is an exploded view of the data storage module of FIG. 1B.

FIG. 2 is an enlarged, exploded view of the data storage module of FIG. 1B. Referring to FIGS. 1B and 2, in the present embodiment, the data storage module 120 mainly includes a data storage device 122, two mounting brackets 124, two pull straps 126 corresponding to the mounting brackets 124, and a plurality of first fasteners 128. The material of the mounting brackets 124 is, for example, steel. The data storage device 122 may be, for example, a hard disk or optical disk drive, and has two opposite side surfaces 122a. Each of the side surfaces 122a is connected to both a top surface 122b of the data storage device 122 and a bottom surface 122c opposite to the top surface 122b. Each of the mounting brackets 124 is disposed to a corresponding one of the side surfaces 122a of the data storage device 122 such that the data storage device 122 can be secured in the computer body 110 via these mounting brackets 124.

More specifically, each mounting bracket 124 of the present embodiment includes a bracket body 124a and at least one mounting portion 124b (the mounting bracket 124 of the present embodiment is illustrated as having two mounting portions 124b). In the present embodiment, the bracket body 124a of each mounting bracket 124 is fastened to the corresponding side surface 122a of data storage device 122 by the first fasteners 128 such as screws, whereby the data storage device 122 and the mounting brackets 124 can be secured together. Each mounting portion 124b is bent from the bracket body 124a in a direct away from the data storage device 122.

Accordingly, when the data storage module 120 is disposed in the receiving space 112 of the computer body 110, the data storage device 122 can be disposed in the computer body 110 by using the mounting portions 124b of the mounting brackets 124. More specifically, the data storage module 120 of the present embodiment can further include a plurality of second fasteners 129, and a plurality of fastening holes 114 are disposed in a portion of the computer body 110 adjacent to the receiving space 112. The second fasteners 129, such as, screws, be through the mounting portions 124b and be engaged into the fastening holes 114, thereby stably mounting the entire data storage module 120 in the computer body 110. It should be noted that, while the data storage module 120 is illustrated as being fastened in the computer body 110 in the present embodiment, the data storage module 120 may also be disposed in the computer body 110 in another suitable manner and therefore there is no limit as to the manner of mounting the data storage module 120.

In addition, in the present embodiment, each mounting bracket 124 may include at least one clamping portion 124c. Each clamping portion 124c is, for example, bent from the corresponding bracket body 124a in a direct toward the data storage device 122 (the clamping portion 124c and the mounting portion 124b are, for example, bent from the corresponding bracket body 124a in opposite directions), and contacts the top surface 122b and bottom surface 122c of the data storage device 122. Therefore, once the entire data storage module 120 is disposed in the computer body 110 (i.e., the mounting brackets 124 is secured to the data storage device 122 and disposed to the computer body 110), the data storage device 122 can be stably positioned in the computer body 110.

In addition, the pull strap 126 is connected to at least one of the mounting brackets 124 such that when the data storage device 122 is disposed in the computer body 110, the pull strap can extend to outside of the computer body 110. In the present embodiment, each pull strap 126 is disposed between the data storage device 122 and the corresponding mounting bracket 124. More specifically, in the present embodiment, each pull strap 126 mainly includes a connecting portion 126a and an operating portion 126b extending from the connecting portion 126a. The connecting portion 126a is attached by adhesive to one surface of the corresponding bracket 124a that faces the data storage device 122, such that when the mounting brackets 124 are fastened to the two side surfaces 122a of the data storage device 122 by the plurality of first fasteners 128, the connecting portion 126a of each pull strap 126 will be clamped between the data storage device 122 and the corresponding mounting bracket 124. As such, when it is desired to remove the data storage module 120 from the computer body 110 which has a limited space therein, after the user disengages the second fasteners 129 from the mounting brackets 124, an upward force can be exerted on the operating portion 126b of each of the pull straps 126, thereby easily removing the data storage module 120 from the computer body 110.

It should be noted that, in the present embodiment, the pull strap 126 is, for example, made of a plastic material such as polycarbonate (PC), thus having good flexibility. As such, after the data storage module 120 is disposed in the receiving space 112 of the computer body 110, the position of the pull strap 126 can be adjusted to a suitable location according to the internal space of the computer body 110 and thus will not increase the space for disposing the data storage module 120. In other words, the provision of the pull strap 126 does not affect the entire size of the data storage module 120, i.e., the data storage module 120 can still have a thinner size and is suitable for disposing in the computer body which has a limited internal space. On the other hand, since the mounting brackets 124 are only disposed to the two side surfaces 122a of the data storage device 122 in the present embodiment, the entire weight of the data storage module 120 can be effectively reduced when compared with the conventional structure in which the entire storage device is surrounded by a mounting bracket.

Figure 3:
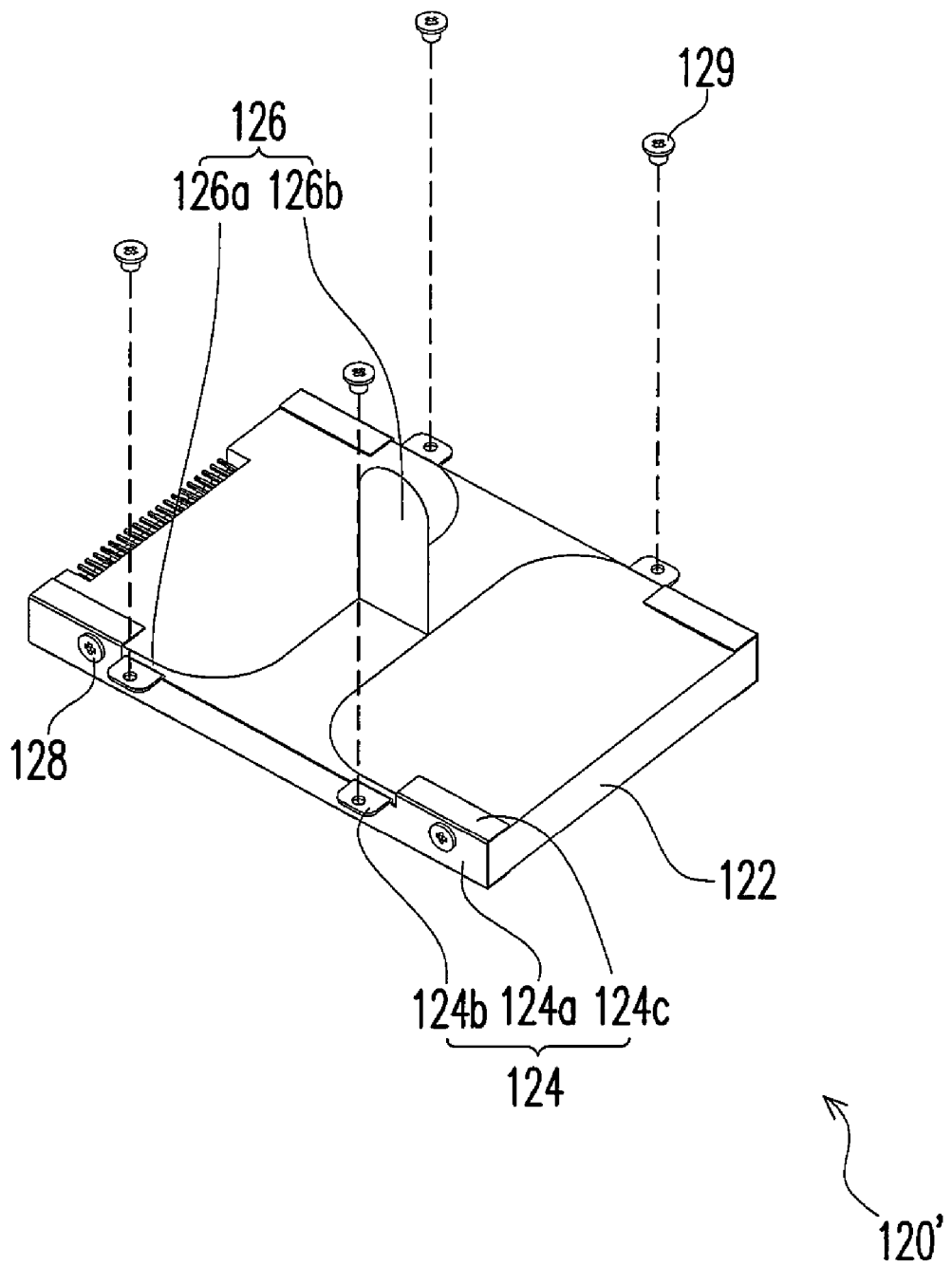
FIG. 3 is an assembled view of a data storage module according to another embodiment of the present invention.

FIG. 3 is an assembled view of a data storage module according to another embodiment of the present invention. Referring to FIG. 3, the data storage module 120' of the present embodiment is similar to the data storage module 120 of the previous embodiment except that, in the present embodiment, a portion of each pull strap 126 between the connecting portion 126a and operation portion 126b thereof is adhered to the top surface 122b of the data storage device 122, and the operation portions 126b of the two pull straps are attached to each other. As such, when it is desired to remove the data storage module 120' from the computer body 110 which has a limited space therein, after the user disengages the second fasteners 129 from the mounting brackets 124, an upward force is exerted on the two operating portions 126b that are attached to each other, thereby easily removing the data storage device 120' from the computer body 110.

It should be noted that, in alternative embodiments of the present invention, the two pull straps 126 can be integrally formed, i.e., the operating portions 126b of the pull straps 126 are connected together to form an arcade-like (or semi-circular) configuration. The connecting portion 126a can be constructed in a similar manner as described in the previous embodiments.

In summary, in the data storage module of the present invention, a mounting bracket is disposed to each of two side surfaces of the data storage device, and the data storage device is stably positioned in the internal space of the computer body via the mounting brackets. In addition, a pull strap is retained between each mounting bracket and the data storage device. Therefore, when desired, the user can easily remove the data storage device from the computer body by merely exerting a force on the pull strap.

It is noted that, due to the good flexibility of the pull strap, after the data storage module is disposed in the receiving space of the computer body, the position of the pull strap can be adjusted to a suitable location according to the internal space of the computer body. In other words, the provision of the pull strap does not affect the entire size of the data storage module, i.e., the data storage module can still have a thinner size and is suitable for a thinner computer body. On the other hand, since the mounting brackets are only disposed to the two side surfaces of the data storage device, the entire weight of the data storage module can be effectively reduced. In view of the foregoing, it can be seen that the data storage module of the present invention can meet a requirement of making the portable computer thinner and is suitable for using in a computer body which has a limited internal space.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fixing structure for mounting a data storage device in a computer body, the data storage device having two opposite side surfaces, the fixing structure comprising:
   two mounting brackets, each disposed to a corresponding one of the side surfaces, the data storage device being disposed in the computer body via the mounting brackets; and
   at least one pull strap connected to at least one of the mounting brackets, the pull strap being extendable to outside of the computer body when the data storage device is disposed in the computer body, wherein
   when the two mounting brackets are fastened to the two side surfaces of the data storage device by a plurality of first fasteners, a connecting portion of each pull strap is clamped between the data storage device and the corresponding mounting bracket, wherein each of the plurality of first fasteners pass through a corresponding hole in the mounting bracket, and a corresponding hole in each pull strap before connecting to the corresponding side surface of the data storage device.

2. The fixing structure according to claim 1, wherein the data storage device further comprises a top surface and a bottom surface opposite to the top surface, each of the side surfaces is connected to both the top and bottom surfaces, and each mounting bracket comprises:
   a bracket body connected to a corresponding one of the side surfaces of the data storage device; and
   at least one clamping portion bent from the bracket body in a direction toward the data storage device and contacting the top and bottom surfaces.

3. The fixing structure according to claim 1, wherein the number of the pull straps is two, each of the pull straps comprises the connecting portion and an operating portion, the connecting portions are connected to respective mounting brackets, and the operating portions are extendable to the outside of the computer body.

4. The fixing structure according to claim 3, wherein the operating portions are capable of contacting on the top surface.

5. The fixing structure according to claim 3, wherein the operating portions are interconnected.

6. The fixing structure according to claim 1, wherein each mounting bracket comprises:
   a bracket body connected to a corresponding one of the side surfaces of the data storage device; and
   at least one mounting portion bent from the bracket body in a direction away from the data storage device.

7. The fixing structure according to claim 6, further comprising a plurality of second fasteners, each fastening a corresponding one of the mounting portions to the computer body.

8. The fixing structure according to claim 1, wherein the data storage device is a hard disk or an optical disk drive.

9. A portable computer comprising:
   a computer body;
   a data storage device disposed in the computer body and having opposite two side surfaces;
   two mounting brackets each disposed to a corresponding one of the side surfaces, the data storage device being disposed in the computer body via the mounting brackets; and
   at least one pull strap connected to at least one of the mounting brackets, the pull strap being extendable to an outside of the computer body when the data storage device is disposed in the computer body, wherein
   when the two mounting brackets are fastened to the two side surfaces of the data storage device by a plurality of first fasteners, a connecting portion of each pull strap is clamped between the data storage device and the corresponding mounting bracket, wherein each of the plurality of first fasteners pass through a corresponding hole in the mounting bracket, and a corresponding hole in each pull strap before connecting to the corresponding side surface of the data storage device.

10. The portable computer according to claim 9, wherein the data storage device further comprises a top surface and a bottom surface opposite to the top surface, each of the side surfaces is connected to both the top and bottom surfaces, and each mounting bracket comprises:
    a bracket body connected to a corresponding one of the side surfaces of the data storage device; and
    at least one clamping portion bent from the bracket body in a direction toward the data storage device and contacting the top and bottom surfaces.

11. The portable computer according to claim 9, wherein the number of the pull straps is two, each of the pull straps comprises the connecting portion and an operating portion, the connecting portions are connected to corresponding mounting brackets, and the operating portions are extendable to the outside of the computer body.

12. The portable computer according to claim 11, wherein the operating portions are capable of contacting on the top surface.

13. The portable computer according to claim 11, wherein the operating portions are interconnected.

14. The portable computer according to claim 10, wherein each mounting bracket comprises:

a bracket body connected to a corresponding one of the side surfaces of the data storage device; and at least one mounting portion bent from the bracket body in a direction away from the data storage device.

15. The portable computer according to claim 14, further comprising a plurality of second fasteners each fastening a corresponding one of the mounting portions to the computer body.

16. The portable computer according to claim 9, wherein the data storage device is a hard disk or an optical disk drive.

* * * * *